(12) United States Patent
Bouriant et al.

(10) Patent No.: US 7,983,988 B2
(45) Date of Patent: Jul. 19, 2011

(54) PROGRESSIVE LICENSING OF COMPONENT-BASED MES SOFTWARE

(75) Inventors: Alexandre Bouriant, Karlsrube (DE); Jan Scheer, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 1755 days.

(21) Appl. No.: 10/500,415

(22) PCT Filed: Oct. 15, 2003

(86) PCT No.: PCT/DE03/03428
§ 371 (c)(1),
(2), (4) Date: Jun. 24, 2004

(87) PCT Pub. No.: WO2004/040485
PCT Pub. Date: May 13, 2004

(65) Prior Publication Data
US 2005/0131711 A1 Jun. 16, 2005

(30) Foreign Application Priority Data
Oct. 24, 2002 (DE) .................................. 102 49 678

(51) Int. Cl.
*G06F 21/00* (2006.01)
(52) U.S. Cl. ........................................... 705/59; 705/54

(58) Field of Classification Search .................. 705/1–79
See application file for complete search history.

(56) References Cited

U.S. PATENT DOCUMENTS

| | | | |
|---|---|---|---|
| 4,937,863 A | 6/1990 | Robert et al. | |
| 6,169,976 B1 * | 1/2001 | Colosso | 705/59 |
| 7,359,882 B2 * | 4/2008 | Eng | 705/59 |
| 2001/0021926 A1 * | 9/2001 | Schneck et al. | 705/54 |
| 2002/0107809 A1 * | 8/2002 | Biddle et al. | 705/59 |
| 2002/0138441 A1 * | 9/2002 | Lopatic | 705/59 |
| 2002/0169725 A1 * | 11/2002 | Eng | 705/59 |
| 2002/0196944 A1 * | 12/2002 | Davis et al. | 380/277 |
| 2003/0135474 A1 * | 7/2003 | Circenis et al. | 705/400 |
| 2003/0163428 A1 * | 8/2003 | Schneck et al. | 705/51 |
| 2003/0172034 A1 * | 9/2003 | Schneck et al. | 705/54 |

* cited by examiner

*Primary Examiner* — Andrew J. Fischer
*Assistant Examiner* — Murali Dega

(57) ABSTRACT

The invention relates to a system (1), a method, and a standard framework (11) for usage-dependent licensing. When use is made of additional functionality, further instances, or specific adapters ($13_{1...n}$), the system (1) will detect whether such use has been authorized by means of a license. If authorization has not yet taken place, a time-limited license will be generated automatically and the manufacturer (21) of the standard framework (11) or, as the case may be, a user ($22p$) who has implemented additional functionality on the basis of the framework will be informed and can generate a license key. The system (1) will disable the functionality after a specific period of time if a license fee is not paid by a user ($22p$, $22s$).

20 Claims, 3 Drawing Sheets

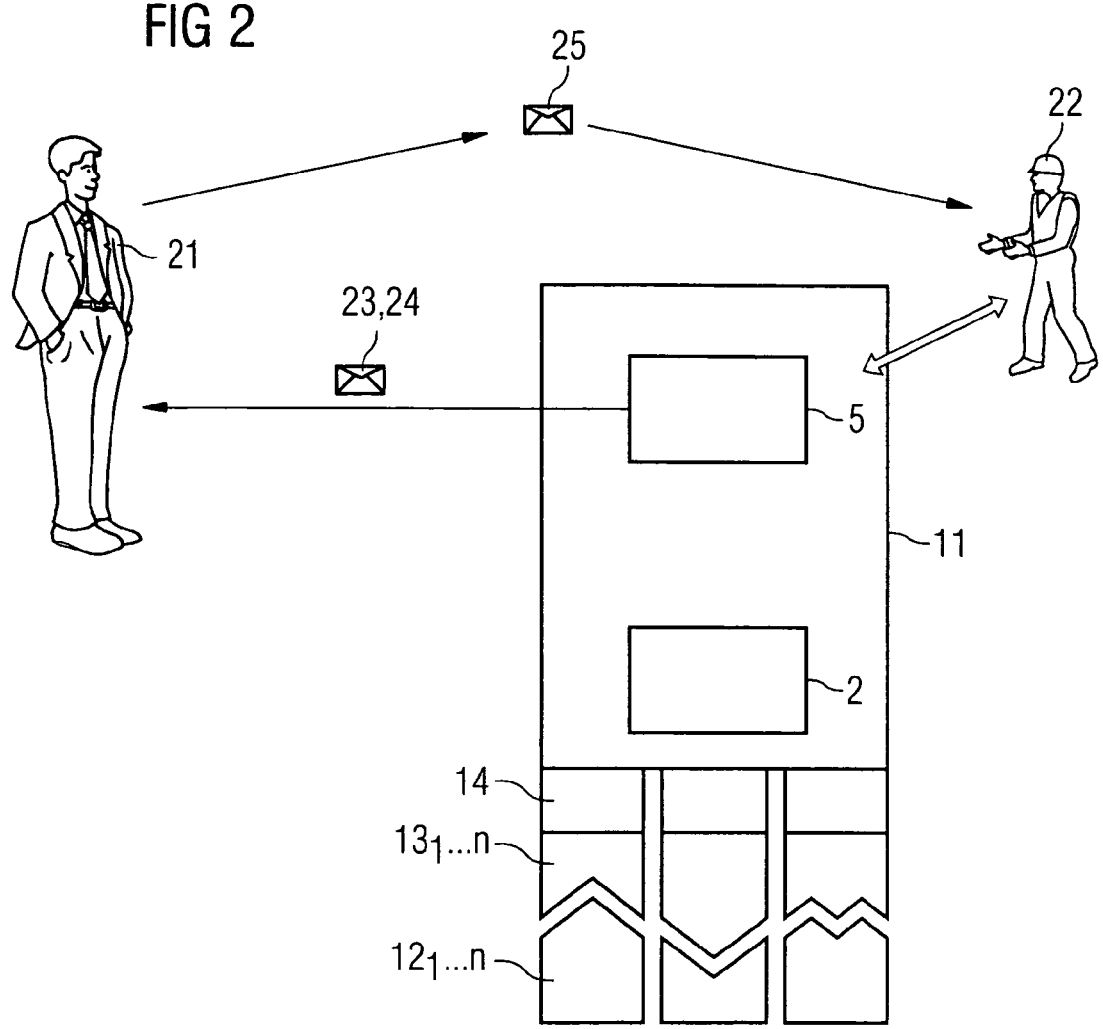

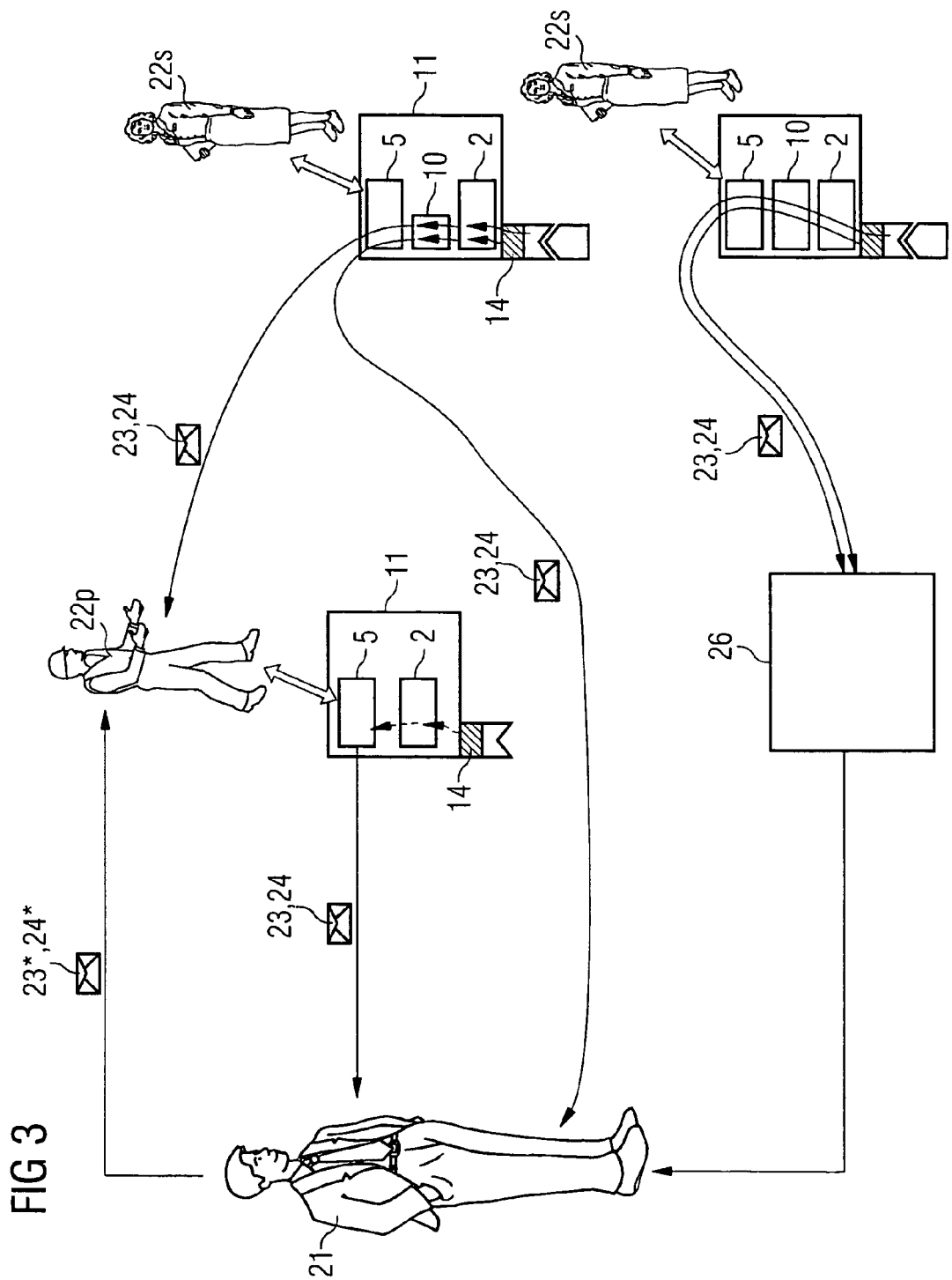

PROGRESSIVE LICENSING OF COMPONENT-BASED MES SOFTWARE

CROSS REFERENCE TO RELATED APPLICATIONS

This application is the US National Stage of International Application No. PCT/DE2003/003428, filed Oct. 15, 2003 and claims the benefit thereof. The International Application claims the benefits of German application No. 10249678.1 filed Oct. 24, 2002, both of the applications are incorporated by reference herein in their entirety.

FIELD OF INVENTION

The invention relates to a system, a method, and a standard framework for the progressive licensing of component-based software systems for controlling a production process.

BACKGROUND OF INVENTION

Increasing use is nowadays being made within the context of industrial production of complex software products performing special control or, as the case may be, monitoring functions within the production process. Software products of said type are likewise employed in managing and analyzing production processes. Said software products are what are termed Manufacturing Execution Systems (MES). Customary MES software products include, for instance, maintenance management systems, systems for historical data management and analysis, systems for scheduling and pacing production flows, and systems for managing and tracking materials and suchlike. Increased use of said type of software products in the industrial periphery has created the need for data to be used within and between the participating MES applications on an end-to-end basis. For this purpose, what are termed integration platforms, for example a standard framework, are used by means of which the participating software applications are integrated into an overall system so that they operate using the same database. The relevant software applications are integrated by means of what are termed adapters. Since an adapter has to be embodied specifically for the respective software application being integrated, said form of application integration is associated with developing a large number of such adapters based on a standard framework of said type. Said adapters can be developed by anyone having a standard framework available. A standard framework thus constitutes an extremely potent basis for integrating software applications in the industrial periphery.

The practice to date has been for a basis of said type to be made available once only to one user, said user thereafter being able to use the functionality, namely developing adapters on the basis of the framework, an unlimited number of times. A user is consequently able to generate any number of adapters which, on being sold to third parties, yield an enormous profit for the user. However, the user only has to pay once for the item on which said profit is based, namely the standard framework. Framework manufacturers currently have to sell their product to individual users for a very high basic price in order to generate a yield commensurate with the standard framework's potential. This is disadvantageous to users when they only exploit a fraction of the standard framework's potential or, as the case may be, when they themselves do not develop any further adapters for integrating software applications with which they can generate a profit. Usage-dependent licensing is nowadays either agreed between a manufacturer and user on a contractual basis, with relevant contracts being concluded in specific, individual cases and with compliance and verification taking place on trust, or said usage-dependent licensing is based on issuing several license keys which, as applicable, can also be ordered or, as the case may be, supplied subsequently.

SUMMARY OF INVENTION

The object of the invention is to disclose a system, a method, and a standard framework enabling simple, progressive licensing accommodated on a technical basis to the standard framework's actually used potential.

Said object is achieved by means of a system for the graduated, usage-equivalent licensing of multifunctional and/or expandable software products having first means for detecting functionality used and for comparing this with a software product's already licensed functionality, second means for providing information about functionality used but not yet licensed, third means for generating lime-limited authorization to use functionality not yet licensed, fourth means for generating an order and/or a request for an offer to a licensor, fifth means for the production of a license by the licensor, and sixth means for permanently authorizing use of the functionality licensed by the system.

Said object is further achieved by means of a method for the graduated, usage-equivalent licensing of multifunctional and/or expandable software products comprising the following steps:

detecting the software product's used functionality and comparing this with its already licensed functionality,
 providing information about functionality used but not yet licensed,
 generating lime-limited authorization to use functionality not yet licensed,
 generating an order and/or a request for an offer to a licensor, and
 production of a license by the licensor and permanently authorizing use of the functionality licensed by the system.

Said object is further achieved by means of a standard framework for integrating software applications, with said standard framework being provided for participating in a system for graduated usage-equivalent licensing.

The invention is based on the knowledge that it is becoming increasingly more difficult nowadays for manufacturers to price complex software products. If the software products developed by a manufacturer offer high potential and if they give the users of said products or, as the case may be, the persons applying them the possibility of generating their own value added as a function of the functionality used, the question arises for manufacturers as to how far they can price-their products in line with the benefits that can be expected on the part of the persons using them.

Moreover, it is advantageous for users of complex software products of this type to have to pay license fees to the manufacturer only in respect of functionality or, as the case may be, services actually used by them. The system according to the invention now makes it possible for users to pay license fees to the manufacturer only in respect of the functionality actually used by them, with already licensed functionalities being identified internally by the software product used. When users employ a functionality not yet enabled by a license key, the system will register said use and draw users' attention, for example with the aid of a dialog window, to their employing a functionality not yet licensed. However, the system at the same time enables users to employ said new functionality free of charge for a certain period of time. The functionality will only be enabled by the system once. Manufacturers will in each case either be informed directly about the use of the new functionality so that, if requested by the user, they can generate a license key, or users will simply be asked by the system if they wish to obtain a license from the manufacturer. Once an order for a new license or, as the case may be, a request for an offer has been received by the manufacturer, the system will be able to generate a license key sent by the licensor to the user of the software product. Implementing of the license key on the part of the user will then ensure permanent licensing of the newly used functionality. Permanent licensing can relate to a license valid for the entire life of the product or only for an extended period of time, such as one year.

Of particular advantage in connection with the system according to the invention is the fact that the software product is capable autonomously of detecting a functionality newly used by the person applying said product. Complicated handling through the user's purchasing new functional components is thereby rendered superfluous in a simple manner. The relevant software's entire functionality or, as the case may be, full potential can be made available by the manufacturer from the first day and a basic license. Successive licensing by the manufacturer will then take place depending on actual use made of the potential. Simple handling of licensing in this way is advantageous both for the manufacturer and for the user. The dispatching of expansion packages is rendered superfluous. Moreover, users can first try out a functionality for a certain period of time to convince themselves of the advantages which using it will bring them.

A further advantageous embodiment of the invention is characterized in that the system has been provided for the graduated licensing of a standard framework, with the standard framework serving to integrate software applications for a production process based on application-specific adapters. Use of the system for licensing a standard framework is particularly advantageous since a framework forms a basis for integrating software products of all kinds. To integrate the software products it is necessary to develop application-specific adapters on the basis of the framework. Owing to the large number of different software products for the production process nowadays in circulation, the number of application-specific adapters developed on the basis of the framework is in some circumstances also large. Especially in the case of a standard framework, the software product concerned is thus one having enormous potential in terms both of further developing customer-specific solutions and of generating a sizable profit on the part of the user of the standard framework. It will for this reason be particularly advantageous if said potential of the standard framework can also be licensed by the manufacturer as a function of the extent to which it is utilized. Especially in the case of a standard framework of this type, said graduated licensing will make it possible to offer the basic product at a relatively favorable price and to levy further charges in the event of its successful use. Said possibility of licensing is of major advantage for both the manufacturer and the user.

A further advantageous embodiment of the invention is characterized in that the first means have been provided for detecting the presence of a new instance of the software product or, as the case may be, standard framework. If a new runtime version of the product is installed by a user on, for example, a system for communicating between system-specific software applications, the manufacturer will be notified of this and appropriate licensing thereupon initiated. A license fee can therefore be levied depending on the scope of the volumes of data to be managed or, as the case may be, of the applications to be integrated within the framework of an industrial production process. There is thus a direct correlation between usage, benefit, and license fee due, which makes fair pricing possible from both the user's and the manufacturer's viewpoint.

A further advantageous embodiment of the invention is characterized in that the first means have been provided for detecting the use of an adapter basis of the software product or, as the case may be, standard framework. This makes it possible to license adapter bases made available by the standard framework for developing application-specific adapters in accordance with the use to which they are put by a person applying them, for example a system integrator. The use made by said person of the respective adapter base will be detected within the system by the standard framework and the manufacturer will be informed about the specific use made by said person. This facilities licensing of the standard framework or, as the case may be, software product as a function of the adapter bases used in the independent development of adapters.

A further advantageous embodiment of the invention is characterized in that the first means have been provided for detecting the expansion of the functionality of the software product or, as the case may be, standard framework. If, within the scope of the standard framework or, as the case may be, relevant software product, a user, for instance a system integrator, implements an additional functionality which is beneficial to another customer and hence can be sold in the form of a solution, then said additional functionality can likewise be licensed within the system's scope.

Said possibility of licensing an expanded functionality is advantageous primarily in conjunction with offering customer-specific solutions in the industrial periphery. A system integrator develops a specific form of integration of different software applications on the basis of the standard framework for, say, a customer. If multiple use is made of said specific solution by said customer, or by further customers, it can likewise be licensed accordingly as a function of the advantage gained through multiple use. Said possibility of licensing is thus also advantageous for both the manufacturer and the user.

A further advantageous embodiment of the invention is characterized in that the second means have been provided for informing users by means of a dialog-window about functionality used by them but not yet licensed and to request the users to obtain a license for the functionality used. Users are advantageously notified hereby that they are using a functionality for which they have not yet paid. After being informed, users will therefore be fully aware that license fees will be due if further use is made by them. It will also be clear to users that they can use functionality only for a certain period of time if they fail to pay the requested license fees.

A further advantageous embodiment of the invention is characterized in that the third means have been provided for issuing a provisional license for a period of time needed for handling the order. and for generating and installing a definitive license. Users of the standard framework or, as the case may be, of special software are hereby enabled to use the relevant functionality for a period of time without paying for it. Users of said framework or software are thus enabled to try it out and weigh up whether its benefits warrant paying a license fee. The period of time during which the functionality is also available without the payment of a license fee is suitably accommodated to allow a proper license to be obtained for the functionality during said period. Both the user and the manufacturer are allowed sufficient time to obtain and generate an appropriate license.

A further advantageous embodiment of the invention is characterized in that the fourth means have been provided for e-mailing the licensor an order for the granting of a license. The manufacturer of the relevant software or, as the case may be, standard framework can hereby be informed by simple means when use is made by a user of a new functionality. System users do not have to additionally dispatch a special application to the manufacturer requesting that an offer be generated. Simple handling of license acquisition is facilitated by this embodiment according to the invention. Additional effort associated with writing and ordering is rendered superfluous for both the user and the manufacturer.

A further advantageous embodiment of the invention is characterized in that a customer-specific account has been provided for automatically debiting the license fee due following receipt of an e-mailed order. If the customer is known to the manufacturer, then the financial transaction associated with obtaining additional licenses can be handled by simple means with the aid of this embodiment. The licensing of additional functionality can thus be structured to require minimal effort.

A further advantageous embodiment of the invention is characterized in that a card on which a pre-paid amount is registered has been provided as the customer account. Said card can be, for example, a Simatic card on which is noted an amount to the extent of which a customer can obtain either services or products from the manufacturer. After indicating the specific card number or, as the case may be, reading the card into a specific device, a customer can at any time be granted a license up to the amount still available there within the scope of the system. This is advantageous principally in giving customers transparency at all times about the amount still available to them.

A further advantageous embodiment of the invention is characterized in that the fourth means have been provided for e-mailing the licensor a request for an offer to grant a license. Alongside the automatic generation of an order for a license, this embodiment also facilitates the submission of a specific request by the user to the manufacturer that the manufacturer send the user an offer for a license. This type of handling is advantageous if, for instance, a user is uninformed about the applicable prices of the licenses. This is likewise the case when the manufacturer's pricing with regard to the respective functionalities is restructured at short intervals. In this case the manufacturer will not have to indicate fixed prices for the respective functionalities as the respective customer will in any event submit a request for details of the current price. This version is particularly advantageous in cases where the software product or, as the case may be, standard framework obtained is used over a period of many years and pricing may change over said period.

A further advantageous embodiment of the invention is characterized in that the fifth means have been provided for producing a license key. If a license is to be issued in exchange for a payment once the order has been received by the manufacturer, a license key can be generated automatically within the scope of the proposed system. The license key is generated specifically for the newly used functionality. It is sent to the respective user and, after implementation, the functionality can be used on a permanent basis. It is here advantageous that the license key is accommodated automatically to the respective newly used functionality.

A further advantageous embodiment of the invention is characterized in that seventh means have been provided for disabling the newly used functionality if licensing is not carried out by the licensor within a specified period of time. This ensures that the functionality cannot be employed by the user on a permanent basis without the payment of a license fee to the manufacturer of the software or, as the case may be, standard framework. This prevents misuse of the standard framework by the user. A usage-equivalent payment of fees to the manufacturer is ensured by means of this advantageous embodiment.

A further advantageous embodiment of the invention is characterized in that the system has been provided for iterative use by a primary user if additional functionality is provided on the basis of the software product or, as the case may be, standard framework by said primary user for secondary users, with use being effected by generating secondary licenses. This embodiment is particularly advantageous for the standard framework's use by service providers such as system integrators, for example. If system integrators obtain a standard framework in order to develop a specific solution for integrating different software applications for a customer on the basis of said framework, said system integrators can make the adapters or, as the case may be, specific solutions developed by them available for the customer in such a manner that the customer has to pay license fees to the system integrator as a function of the frequency with which said adapters or, as the case may be, functions are used. So if, for example, a specific adapter is given more than one instance by a customer because, say, the same software is used and incorporated on a multiple basis, then with the aid of the proposed system according to the invention the system integrator will be able to collect license fees as a function of the number of the adapter's instances. This will enable system integrators to, by simple means, invoice an end customer in respect of the service they have performed. This embodiment is likewise advantageous for end customers as they have to pay as a function of the number of instances used of a solution, which is equivalent to the benefit accorded said end customers.

A further advantageous embodiment of the invention is characterized in that the system has been provided for provisioning a license key function for the primary user for the specifying of a licensing identity by said primary user. This enables primary users, which is to say a system integrator, for example, to furnish the adapters or, as the case may be, functions developed by them with a specific identity. Their use by an end customer will be detected as will also the respective identity of the function used. On the basis of said identity, different license amounts can be generated for the respective developed solutions or, as the case may be, adapters as a function of the degree of complexity and effort. The origin of a functionality or, as the case may be, adapter can also be determined by means of this embodiment. This will ensure, for example, that the functions or, as the case may be, adapters can be tracked back to their respective manufacturer in the event of a higher degree of complexity when several service providers have made different functions or, as the case may be, adapters available, and that the respective license fee is also paid to the appropriate manufacturer.

A further advantageous embodiment of the invention is characterized in that the system has been provided for the flexible scalability of the secondary licenses by the primary user. The amount of the license fee to be paid can hereby be accommodated to an adapter's or specific solution's complexity or, as the case may be, manufacturing effort. An as flexible as possible license model correlated directly with the respective benefit to the customer can be developed on this basis. Maximum pricing flexibility is facilitated thereby.

A further advantageous embodiment of the invention is characterized in that eighth means have been provided for apportioning the license fees to be paid by the secondary user to the licensor and primary user. If an end customer employs, say, the standard framework to integrate different software applications, the actual solution having been provided through the development by a system integrator of specific adapters, the customer will then have to pay license fees to both the system integrator and the manufacturer of the standard framework. To facilitate simple handling of the payment of the respective license fees, provision has been made for the system to automatically apportion the license fees due to the manufacturer and those due to the system integrator. Given a solution of such complexity, individual customers cannot be expected to concern themselves with the correctness of the respective license fees. The system will, by simple means, relieve them of this burden so that the correct fees will in each case be paid to the appropriate recipient.

A further advantageous embodiment of the invention is characterized in that provision is made for apportioning the license fees via a web licensing service. This entails provisioning by the manufacturer of the standard framework of a service embodied such that the fees are paid to the manufacturer of the standard framework by the end customer once only in each case. The manufacturer is thereafter responsible for passing on to further service providers such as, say, system integrators who have developed specific functionality or, as the case may be, adapters the license fees due to them. This means that handling with respect to the customer is carried out entirely by one manufacturer, resulting in simplified invoicing for the customer. Manufacturers will then perform a service toward system integrators to the extent of ensuring said integrators receive the licenses implemented with the aid of the license key function. This handling of license fee payments is advantageous for integrators as they themselves do not have to establish any special infrastructure for licensing of this type involving substantial effort when supplies are made to several customers. It is rather the case that use of the manufacturer's infrastructure will permit simple handling of the payment modalities.

The invention is described and explained in more detail below with the aid of the exemplary embodiments shown in the Figures.

BRIEF DESCRIPTION OF THE DRAWINGS

FIG. 2 is a schematic of a standard framework for integrating software applications as an example of a software product requiring to be licensed, and FIG. 3 is a schematic of the licensing by a manufacturer of a complex software product.

DETAILED DESCRIPTION OF INVENTION

Figure 1:
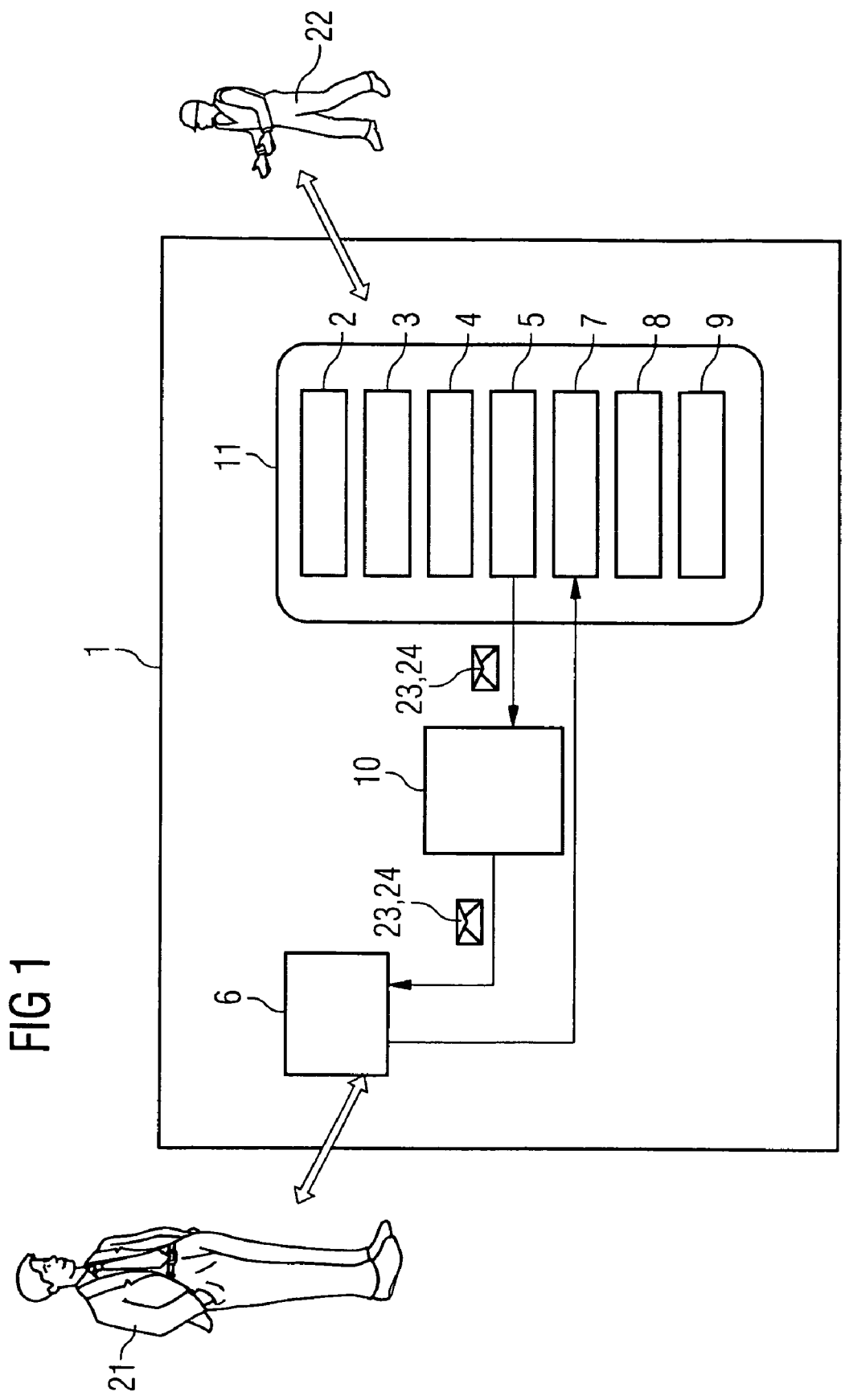
FIG. 1 is a schematic of a system for the graduated, function-dependent use of complex software products.

FIG. 1 shows a system 1 for automatically licensing used functionality of a software product 11 when used by a user 22. The system 1 has first means 2 which detect if a new functionality not yet paid for or, as the case may be, licensed of the software product 11 is being used by the user 22. The user 22 is informed by the second means 3 for providing information about using a functionality not yet paid for. Time-limited authorization to use the respective functionality is generated with the aid of the third means 4. An order 23 from the user 22 to the manufacturer 21 of the software product to obtain a license is generated by the fourth means 5. A request 24 for an offer 25 can, however, also be generated by the fourth means 5. A license for the respective new functionality is produced with the aid of the fifth means 6. Permanent authorization to use the newly used functionality or, as the case may be, authorization to use it for an extended period of time such as one year, for example, has been provided by the sixth means 7 and disabling of the functionality in the event of non-payment of a license fee is performed by the seventh means 8. With the aid of a license key function 10 a primary user $22p$ can generate further licenses in the form of secondary licenses for additional functionality developed by said user. Secondary licenses in the event that the functionality of the software 11 is expanded by a service provider are apportioned by the eighth means 9.

The special feature of the system 1 shown in FIG. 1 is essentially that a complex software product 11 such as, say, a standard framework for integrating software applications takes care autonomously of the graduated licensing of additionally used functionality. Special means 2 for detecting used functionality are implemented for this purpose within the software product 11. The means 2 are here capable of distinguishing between already licensed and not yet licensed functionality. A user 22 using a new functionality not yet paid for by said user will be informed of this with the aid of the means 3 for providing information. This can be done by means of, for example, a dialog window notifying user 22 of using functionality not yet paid for. The software 11 on this database simultaneously sends an order 23 or, as the case may be, request 24 to a manufacturer 21 to generate a license. Said order 23 or, as the case may be, request 24 to send an offer 25 is sent automatically by the means 5. The user 22 is simultaneously enabled to make time-limited use of the respective functionality of the software product 11 by the means 4 for generating an authorization. On receipt of an order from the user 22, a license key will be generated by the manufacturer 21 with the aid of the means 6 for producing a license. On receipt by the user 22 of said license key, following its implementation the respective functionality will be enabled permanently or, for example, for an extended period of time by the means 7 for permanent authorization. If a special license is not obtained by the user 22, the respective functionality will be disabled with the aid of the means 8 on expiration of the time-limited authorization. Disabling will prevent misuse by a user 22 of functionality not yet paid for. For a primary user $22p$, for example a system integrator, the software product 11 provides the possibility of generating secondary licenses with the aid of the license key function 10 in order to further license functionality or, as the case may be, adapters developed by said user to an end customer. The special feature of the proposed system 1 is principally that licensing is detected and can be dealt with entirely automatically. The acquisition by a user 22 of any additional software components that may be required is rendered superfluous by the proposed system 1 because an item of software or, as the case may be, a software product, like a standard framework 11, automatically detects the extent to which it is being used and then invoices said use to a user 22 accordingly on a pro rata basis through a request for licenses for specific functionalities.

FIG. 2 is a schematic of an exemplary standard framework 11 which is in the form of a software product for integrating software applications $12_1 \ldots n$ and which can be licensed within the scope of the system 1 according to the invention with reference to specific functionality. The standard framework 11 has adapter bases 14 serving as a basis for developing application-specific adapters $13_1 \ldots n$. A user 22 can use the standard framework 11 and functionality used by said user will be detected by the means 2, said means 2 being capable of distinguishing between already licensed and not yet licensed functionality. A request 24 or order 23 is sent to the manufacturer 21 by the standard framework 11 by the means 5. On receipt of a request 24 the manufacturer 21 will send an offer 25 to the user 22 to license the respective software.

The special feature of the exemplary embodiment of the system 1 shown in FIG. 2 is that a standard framework 11, being a particularly complex software product for integrating software applications $12_1 \ldots n$, can be licensed as a function of successively used functionality. The software applications $12_1 \ldots n$ are integrated on the basis of application-specific adapters $13_1 \ldots n$. The adapters $13_1 \ldots n$ can be developed by, for example, a system integrator on the basis of the adapter bases 14. License fees will be due from the system integrator or end customer depending on the use made of the adapter bases 14 by the system integrator or, as the case may be, the use made of the specific adapters $13_1 \ldots n$ by the end customer. The use will here be detected by the means 2 integrated in the standard framework. The use not yet authorized by means of a license of an adapter base 14 or, as the case may be, an adapter $13_1 \ldots n$ will be detected as such and information about said use will be conveyed to a manufacturer 21 or, as the case may be, system integrator. This will allow successive licensing of actually used functionality especially when complex software applications are integrated as part of an industrial automating process. Said possibility of licensing is especially advantageous for a standard framework 11 as the actual benefit obtained from using a standard framework 11 consists of the increased inclusion of further software applications. The standard framework 11 therefore increases in value for a user 22 as the use made of adapter bases 14 and of developed adapters $13_1 \ldots n$ increases. In the system 1 according to the invention the manufacturer 21 is advantageously automatically informed about the use of additional functionality by the means 5 for generating an order 23 or, as the case may be, for submitting a request 24 to the manufacturer 21. In the case of a request 24, an offer 25 to grant a license will be sent by the manufacturer to the user 22. Within the scope of the proposed system the licensing modalities are thus handled by simple means entirely automatically.

FIG. 3 is a schematic of the handling of license fee payments within the scope of the system 1 according to the invention. The functionality used in the form of, for example, an application-specific adapter $13_i$ by a secondary user $22s$ will be detected by the software products 11 or, as the case may be, standard framework with the aid of the means 2 and an order 23 or, as the case may be, a request 24 for an offer 25 will be sent. The order 23 or, as the case may be, request 24 will be sent by the software product 11 to a web licensing service 26 which will forward the order 23 or, as the case may be, request 24 to a manufacturer 21. The manufacturer 21 will thereupon apportion the functionality originating from himself or, as the case may be, from a system integrator then forward the revenues respectively due to the system integrator or, as the case may be, primary user $22p$. The request 24* or, as the case may be, order 23* to generate a license will additionally be forwarded from the manufacturer 21 to the primary user 22 when this is done.

In like manner it is, however, possible within the scope of the system 1 according to the invention, for example, for it to be detected by means of the software 11 used who produced or, as the case may be, implemented the functionality used, and the order 23 for a license or, as the case may be, the request 24 for the offer relating to a license is sent either to the manufacturer 21 of the software or to the manufacturer $22p$ of the additional functionality, for example of the adapter $13_i$.

The special feature of the exemplary embodiment of the invention shown in FIG. 3 lies principally in enabling just one contact interface to be made available with respect to the customer, which is to say the secondary user $22s$. What is termed the web licensing service 26 serves here to accept the orders 23 or, as the case may be, inquiries 24 from the customer, to process them, and to convey them to the manufacturer 21 of the respective software 11. It is then incumbent upon the manufacturer 21 to effect forwarding to a primary user $22p$, which is to say to someone who has used the software product 11 for further developing and implementing additional functionality in the form of, for example, application-specific adapters $13_1 \ldots n$. This makes it very much easier where the customer $22s$ is concerned to license functionality used by said customer, and a primary user $22p$ requires no separate infrastructure for handling license business with the end customers $22s$. Said primary user is relieved of handling licensing business by the manufacturer 21 of the software 11, for example of the standard framework. The system 1 thus overall makes simple handling of licensing possible.

It is, however, also possible at the same time for the license fees to be paid directly to the person who made the functionality available, for example to the manufacturer 21 of the software 11 and to the primary user $22p$ as the provider of specific functionality based on the software 11. A connection between the manufacturer 21 and the primary user $22p$ of the software 11 is then no longer necessary in the case of this model of license levying shown by way of example.

Summarizing, the invention relates to a system 1, a method, and a standard framework 11 for usage-dependent licensing. When use is made of additional functionality, further instances, or specific adapters $13_{1 \ldots n}$ the system 1 detects whether such use has been authorized by means of a license. If authorization has not yet taken place, a time-limited license will be generated automatically and the manufacturer 21 of the standard framework 11 or, as the case may be, a user $22p$ who has implemented additional functionality on the basis of the framework will be informed and can generate a license key. The system 1 will disable the functionality after a specific period of time if a license fee is not paid by a user $22p$, $22s$.

The invention claimed is:

1. A computerized automation system for the graduated, usage-equivalent automatic licensing of multifunctional and/or expandable software products, comprising:

at least one computer having an integration platform to integrate selected ones of a plurality of software products purveyed by a licensor to a systems integrator through the system, the integration platform being arranged by the systems integrator to form a Manufacturing Execution System (MES), which when executed by a processor is arranged to control an automated production process, wherein the integration platform comprises an adaptor base, wherein the adaptor base is adaptable by the systems integrator to create respective application-specific adaptors, wherein a solution to be executed by the processor arranged to control the automated production process comprises at least one of the following: a first group of software products as integrated by the systems integrator in the integration platform without application-specific adaptors, and a second group of software products as integrated by the systems integrator and further including application-specific adaptors, wherein the solution is purveyed by the systems integrator to an end user through said system, wherein the solution can be expanded by the systems integrator to include additional software products and/or application-specific adaptors based on new functionality provided by the additional software products and/or application-specific adaptors;

a first mechanism for detecting functionality used and for comparing this with already licensed functionality of a software product;

a second mechanism for providing information regarding functionality used but not yet licensed;

a third mechanism for generating time-limited authorization to use functionality not yet licensed;

a fourth mechanism for generating an order and/or a request for an offer to the licensor;

a fifth mechanism for creating a license by the licensor; and a sixth mechanism for permanently authorizing use of the functionality licensed by the system, wherein a license fee is based on the following: a volume of data managed by the integration platform in connection with the automated production process, the software products integrated in the integration platform and a number of application-specific adaptors used by the MES for providing the solution to the automated production process.

2. A system according to claim 1, wherein the first mechanism is adapted for detecting a new instance of the software product or the integration platform.

3. A system according to claim 1, wherein the first mechanism is adapted for detecting the use of the adapter base.

4. A system according to claim 1, wherein the first mechanism is adapted for detecting the expansion of the functionality of the software product.

5. A system according to claim 1, wherein the second mechanism is adapted for informing a user by a dialog window about functionality used by said user but not yet licensed and to request said user to obtain a license for the functionality used.

6. A system according to claim 1, wherein the third mechanism is adapted for issuing a provisional license for a period of time needed for handling the order and for generating and installing a permanently valid license.

7. A system according to claim 1, wherein the fourth mechanism is adapted for e-mailing the licensor an order for the granting of a license.

8. A system according to claim 7, wherein a customer-specific account has been provided for automatically debiting the license fee due following receipt of an e-mailed order.

9. A system according to claim 7, wherein a card on which a pre-paid amount is registered is provided as the customer account.

10. A system according to claim 1, wherein the fourth mechanism is adapted for e-mailing the licensor a request for an offer to grant a license.

11. A system according to claim 1, wherein the fifth mechanism is adapted for granting a license for producing a license key.

12. A system according to claim 1, wherein a seventh mechanism is adapted for disabling the newly used functionality if licensing is not carried out by the licensor within a specified period of time.

13. A system according to claim 1, wherein the system is adapted for iterative use by a primary user if additional functionality is provided on the basis of the software product or the integration platform by the primary user for secondary users, with use being effected by generating secondary licenses.

14. A system according to claim 13, wherein the system is adapted for provisioning a license key function for the primary user for the specifying of a licensing identity by the primary user.

15. A system according to claim 13, wherein the system is adapted for a flexible scalability of the secondary licenses by the primary user.

16. A system according to claim 13, wherein an eighth mechanism is provided for apportioning the license fees to be paid to the licensor and primary user by the secondary user.

17. A system according to claim 16, wherein apportioning of the license fees is provided via a web licensing service.

18. A system according to claim 1, wherein the first mechanism is adapted for detecting the expansion of the functionality of the integration platform.

19. A system according to claim 1, wherein the first mechanism is adapted for detecting the expansion of the functionality of the integration platform.

20. An article of manufacturing comprising a computer-usable storage medium having computer-readable code, which when executed by a computer is arranged to form an automation system for the graduated, usage-equivalent automatic licensing of multifunctional and/or expandable software products, the computer-readable code comprising:

computer-readable code arranged as an integration platform to integrate selected ones of a plurality of software products purveyed by a licensor to a systems integrator through the system, the integration platform being arranged by the systems integrator to form a Manufacturing Execution System (MES) to control an automated production process, wherein the integration platform comprises an adaptor base, wherein the adaptor base is adaptable by the systems integrator to create respective application-specific adaptors, wherein a solution arranged to control the automated production process comprises at least one of the following: a first group of software products as integrated by the systems integrator in the integration platform without application-specific adaptors, and a second group of software products as integrated by the systems integrator and further including application-specific adaptors, wherein the solution is purveyed by the systems integrator to an end user through said system, wherein the solution can be expanded by the systems integrator to include additional software products and/or application-specific adaptors based on new functionality provided by the additional software products and/or application-specific adaptors;

computer-readable code for detecting functionality used and for comparing this with already licensed functionality of a software product;

computer-readable code for providing information regarding functionality used but not yet licensed;

computer-readable code for generating time-limited authorization to use functionality not yet licensed;

computer-readable code for generating an order and/or a request for an offer to the licensor;

computer-readable code for creating a license by the licensor; and computer-readable code for permanently authorizing use of the functionality licensed by the system, wherein a license fee is based on the following: a volume of data managed by the integration platform in connection with the automated production process, the software products integrated in the integration platform and a number of application-specific adaptors used by the MES for providing the solution to the automated production process.

* * * * *